UNITED STATES PATENT OFFICE.

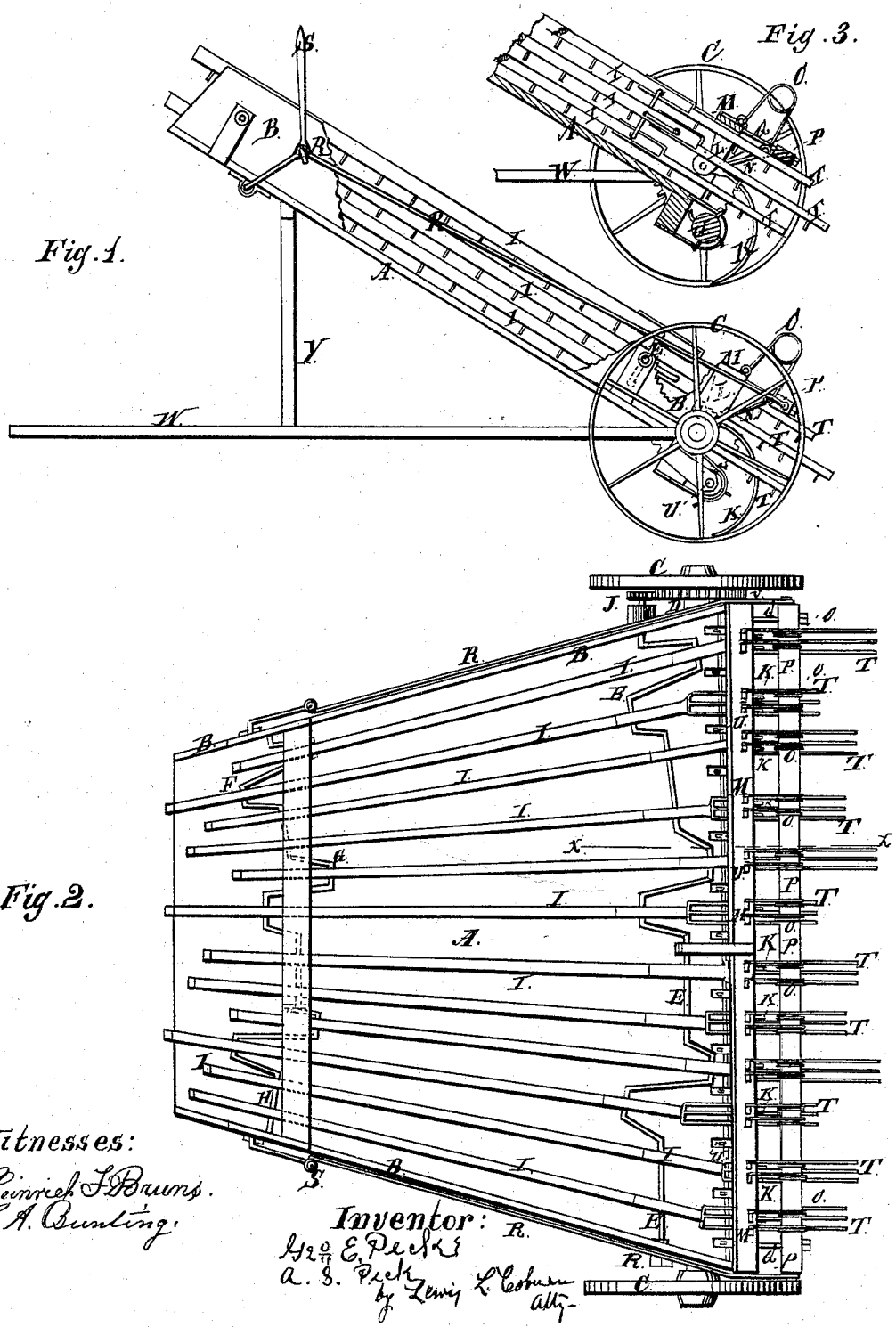

GEORGE E. PECK AND ALBERT S. PECK, OF GENEVA, ILLINOIS.

IMPROVEMENT IN HAY-LOADERS.

Specification forming part of Letters Patent No. 171,484, dated December 28, 1875; application filed April 6, 1875.

*To all whom it may concern:*

Be it known that we, GEORGE E. and ALBERT S. PECK, of Geneva, county of Kane and State of Illinois, have invented an Improvement in a Hay Gatherer and Loader, of which the following is a specification:

The object of our invention is to make a machine which will gather the hay from the ground and elevate it upon the cart sufficiently high to make a load.

Our invention consists of the mechanisms hereinafter more specifically described and claimed.

In the accompanying drawings, Figure 1 represents a side elevation of our machine, with a part of one of the side pieces of the elevating-platform cut away. Fig. 2 represents a top or plan view. Fig. 3 represents a section taken at the line *x x* in Fig. 2.

A represents an inclined-tapering platform with side pieces B. C C are wheels constructed in any of the usual methods, running upon spindles, solidly attached to the inclined platform A. D is a cog-wheel, firmly attached to the inner end of the hub of one of the wheels C. E is a crank-shaft, with its crank made at quarter angles. This crank-shaft extends across the elevating inclined platform A, and has its bearings in its side pieces B B. F, G, and H are three crank-shafts, which together extend across above the upper end of the elevating-platform A; the shafts F and H being placed at right angles to the side pieces B, and the middle shaft G being placed parallel with the shaft E. This arrangement of these shafts secures a good bearing for the journals of the shafts, the easy working of the latter, and their accommodation to the tapering form of the inclined trunk. These crank-shafts carry the tooth-pieces I, and are driven by the spur-wheel J, securely fastened to the lower crank-shaft E. By arranging the cranks at quarter angles, one-fourth of the tooth pieces I are always upon the hay as it is being elevated or carried up the platform A, and the upper crank-shafts are driven by these tooth-pieces I.

K are rake-teeth, pivoted to arms L, extending down from the cross-piece M. N are arms extending up from the rake-teeth, to which one end of the spring O is attached. These springs O are firmly attached at one end to the cross-piece M, while the other end is attached to the arm N of one of the rake-teeth.

P is a sliding bar, supported by rods Q. The ends of the springs O pass down behind the sliding bar P. By moving the sliding bar forward with sufficient force to overcome the pressure of the springs O, the rake-teeth are all turned upon their pivots by this sliding bar striking against their arms N.

R R are rods connected with the lever S and the sliding bar P, by which the operator raises the rake-teeth. There are attached to the lower end of the tooth-pieces I pronged pieces *t*, one prong of each piece passing between every two rake-teeth to draw the hay from the rake upon the elevating-platform A. These prongs have teeth projecting downward, as clearly shown in Fig. 1. The drawing shows rake-teeth at intervals with unequal spaces between them.

In making the machine, any number of rake-teeth may be used at any suitable distance apart, but we intend making one of the prongs of the pieces T extend in every space between the rake-teeth. The object of these pieces T is to provide as many devices for taking the hay from the rake as there are rake-teeth, and at the same time not having more pieces I than can be accommodated upon the elevated platform A.

U is a toothed roller hung in the lower end of the platform A, and driven from the cog-wheel D by the cog-wheel V secured to its end. This revolves beneath the rake-teeth and also serves to carry the hay from the rake upon the platform A. W is a tongue, by which the machine is attached to the hay-cart, upon which the hay is delivered. Y is a support, supporting the elevated platform A from the tongue W.

The springs O being attached to the arm N of the rake-teeth make a pressure holding the teeth down. The hay is elevated after it is delivered upon the platform A by the tooth-pieces I, which are carried in such a direction as to keep the hay constantly sliding up the platform by the crank-shafts above described. The hay is gathered together as it is carried up the platform and delivered upon the load in a convenient form for handling.

I claim—

1. The pivoted rake-teeth K, provided with arms N projecting upward above the rake-head, substantially as and for the purposes set forth.

2. The combination of the gathering-rake and the toothed extension-pieces T, attached to the elevating-rakes I and projecting back between the teeth of the gathering-rake, substantially as and for the purposes set forth.

3. The sliding bar P, in combination with the springs O and pivoted rake-teeth, provided with arms N, substantially as described.

4. The tooth-roller U, in combination with the rake-teeth K, toothed pieces T, and elevating-platform A, as and for the purposes specified.

5. The combination of the shafts F, G, H, with the tapering platform A, the shafts F and H being hung at right angles to the side pieces of the platform, substantially as and for the purposes set forth.

GEO. E. PECK.
A. S. PECK.

Witnesses:
L. M. KELLEY,
J. P. WHEELER.